Andrews & Austin,
Cook Stove.
RX No. 40.
Reissued June 8. 1842.
9818X
RELATED DOC
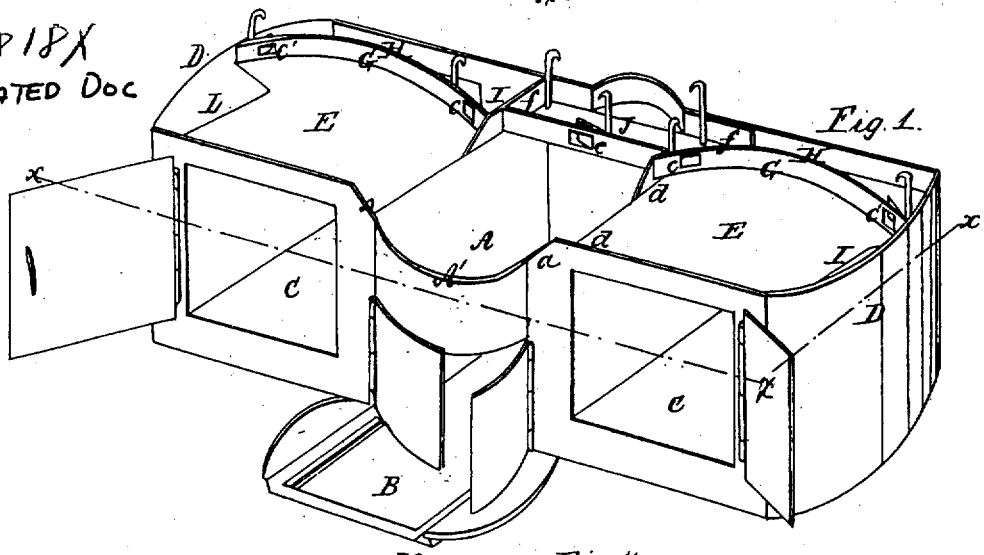
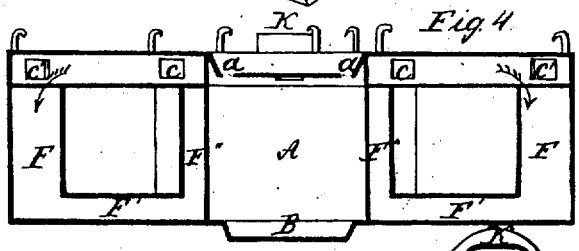
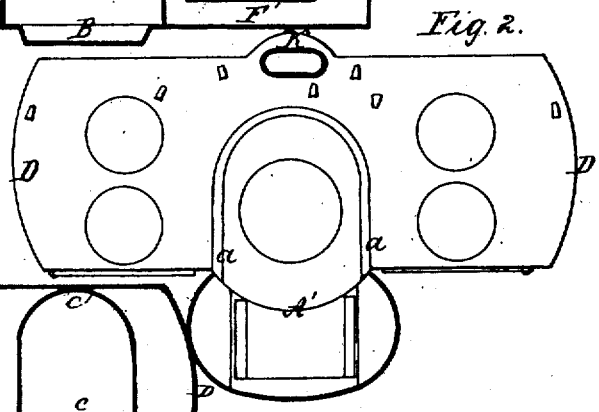
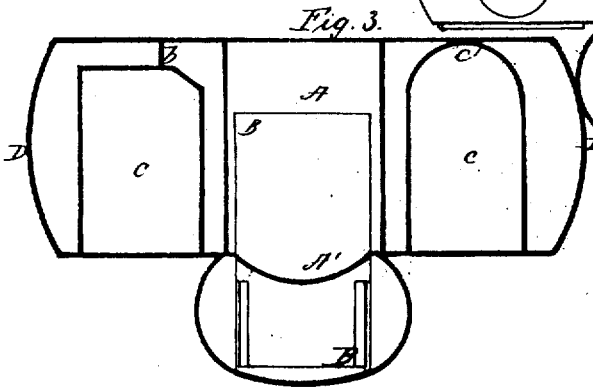

UNITED STATES PATENT OFFICE.

Rx 40

AUSTIN PACKARD, OF NEW YORK, N. Y., ASSIGNEE OF ANDREWS & AUSTIN.

IMPROVEMENT IN THE FORM AND CONSTRUCTION OF COOKING-STOVES.

9818 RELATED DOC

Specification forming part of Letters Patent dated July 1, 1836; Reissue No. 40, dated June 8, 1842.

*To all whom it may concern:*

Be it known that I, AUSTIN PACKARD, of the city of New York, in the State of New York, assignee of all the right, title, and interest of EBENEZER ANDREWS and STEPHEN AUSTIN in and to a Cooking-Stove, for which Letters Patent of the United States were granted to said AUSTIN and ANDREWS, dated on the first day of July, in the year 1836, having found the specification or description of said stove to be defective, have surrendered the said Letters Patent to the United States for the purpose of removing the said defects; and I do hereby declare that the following is a full and exact description of the manner of constructing the said stove.

In the accompanying drawings, Figure 1 is a perspective view of the improved cooking-stove, the top plate thereof being removed for the purpose of showing the openings into the flues and of the valves or dampers by which the direction of the draft is governed. Fig. 2 is a top view of the stove with the top plate thereon. Fig. 3 is a horizontal section in the line *x x* of Fig. 1, and Fig. 4 a vertical section from end to end through the middle.

A A is the fire-chamber, which is represented as having a swelled front, A′; but this may be straight, if preferred. The dimensions of the fire-chamber should be such as to correspond with the size of the stove. For a stove of ordinary size it may be twenty inches long, sixteen wide, and twelve high.

B B is the sunk hearth or ash-pit, which does not differ from that of many other stoves.

C C are two ovens—one on each side of the fire-chamber. These ovens have flue-spaces beneath them, which extend from front to back and from the side plates of the fire-chambers to the end plates, D D, of the stove, which end plates are represented as curved, but which may be flat, if preferred.

In the stove with a fire-chamber of the size above named the ovens may be each twenty inches in length, seventeen inches wide, and fifteen inches high. They may, however, be of the same height with the fire-box; but a depression is usually made in the top plate of the stove, as at *a a*, and the height of the fire-box is thereby contracted.

E E are the top plates of the oven, between which and the top plate of the stove there is a flue-space leading from the fire-chamber to the ends of the stove; and the heated air passes thence to a descending flue, F F, at each end of the stove; thence under the oven through flues F′ F′, which pass between it and the bottom plate of the stove; thence up through the flues F² F², between the oven and the fire-box, nearly to the flue-space above the ovens. The flue-spaces are usually constructed so as to extend nearly round the back part of the oven, and this may be done by making the back plate of the oven circular, so that it shall touch the back plate of the stove, as at C′, Fig. 3. The heated air passing around the oven will thus be brought into contact with the said back plate. The same may be effected when the back oven-plate is flat by means of a partition-plate, *b*, extending perpendicularly up the back flue-space. A partition, G, Fig. 1, which is generally made in the form of a segment of a circle, passes along the flue-space above each of the ovens, and extending from the fire-box to the end plates of the stove, and these may terminate near the middle of said end plates. A flue space, H—say of five or six inches square—is thus formed between said circular plates and the back plate of the stove. The top plates, E E, of the oven extend at their back parts to the back plate of the stove, and constitute the bottoms of said flues; but an opening five or six inches square is left through them at I, where they are cut away to allow a passage for the smoke and heated air to pass from the flues which surround the ovens into the flue-space J, from the middle of which flue rises the escape or smoke pipe K.

Through the circular partitions G G openings C C C′ C′ are made, which may be closed by dampers, the handles of which are shown in the drawings; and when these are closed the smoke and heated air will pass over the plates E E and through the spaces shown at L L, leading into the flue-spaces F F, and thence under and around the oven through the passage I into the flue J at the back part of the fire-box. Dampers may also be placed at the mouth of each of the flues from the fire-box, extending across them, as from *d* to *d*, and these would serve to turn the whole heat on one side by leaving one of them open and closing the other. A like effect will be produced by omitting dampers at *d d* and placing dampers *f f* at each end of the flue-space J, as shown in the drawings, for if one of these be closed it will manifestly arrest the draft entirely around one of the ovens. The dampers at *c c* in the circular partition near the fire-box make, when shut, a part of said circular partitions, and when the heat is not wanted over the ovens these may be opened to allow a more direct passage to the escape-pipe. A still more direct passage from the fire-chamber to the escape or stove pipe may be made by means of a damper, *e*, leading from it into the flue-space J. When it is desired to allow the draft to pass under the boilers on either side of the fire-chamber, but not around the oven, this may be effected by closing the valves *c c* and opening the valves *c′ c′*. It will be seen, therefore, that from the manner in which the respective flues, partitions, and dampers are placed and arranged the heat may be equalized around the sides of the oven and the draft so directed as to obtain the greatest advantage in its direction and management for cooking purposes.

Having thus fully described the manner in which this cooking-stove is conctructed, and in which the respective parts thereof are combined and arranged, what is claimed therein as new, and which it is desired to secure by Letters Patent, is—

The manner of arranging the flue-spaces H by means of the partitions G, which are herein denominated the "circular partitions," and also the particular manner of arranging and combining the two ovens with the fire-chamber between them in connection with the reversible flues—that is to say, so as to direct the draft around the ovens in the horizontal and the descending and ascending courses, and to effect the purpose for which they are designed, as herein set forth.

AUSTIN PACKARD.

Witnesses:
WM. H. TAGGARD,
CHARLES H. WEBSTER.